United States Patent Office 2,893,511
Patented July 7, 1959

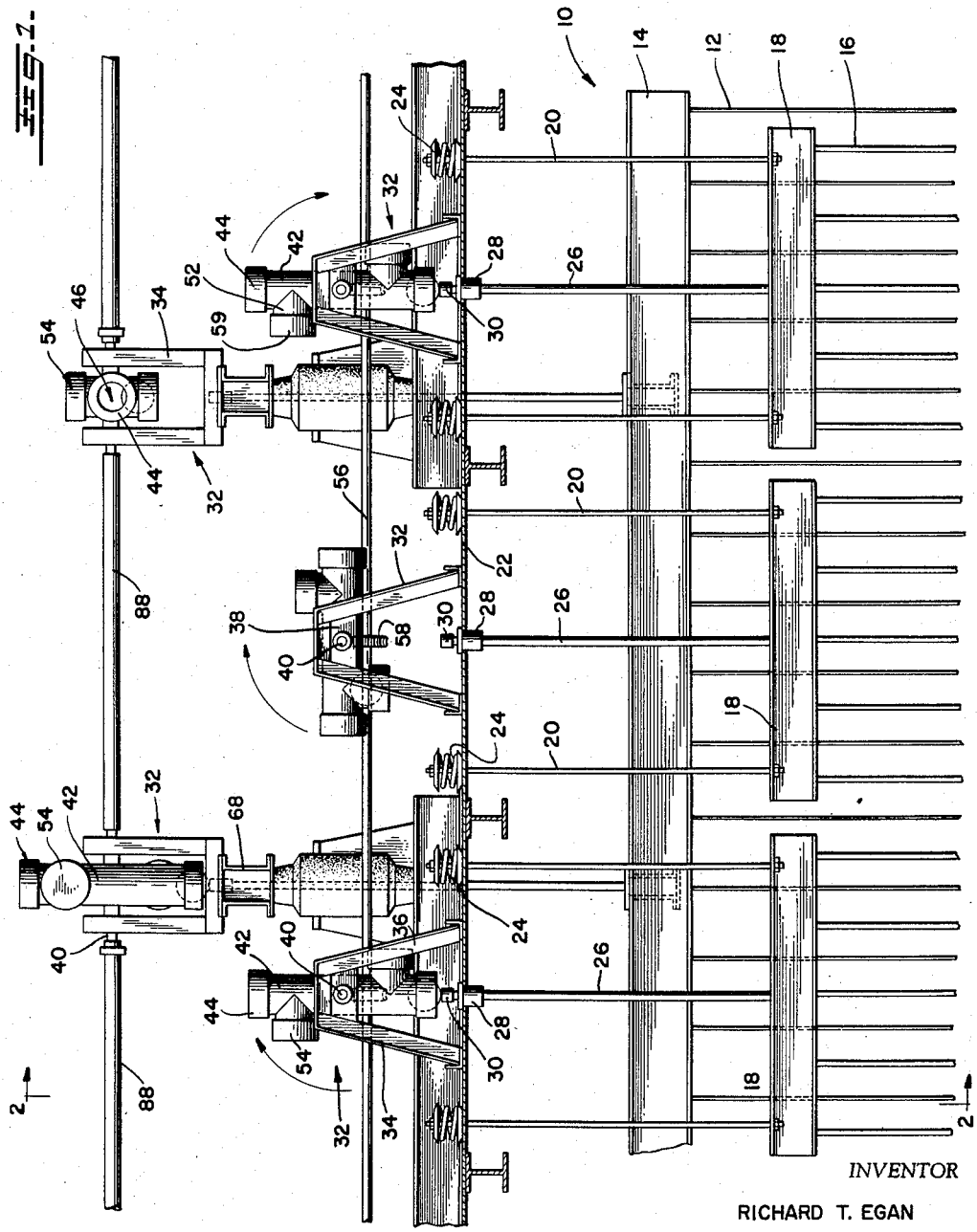

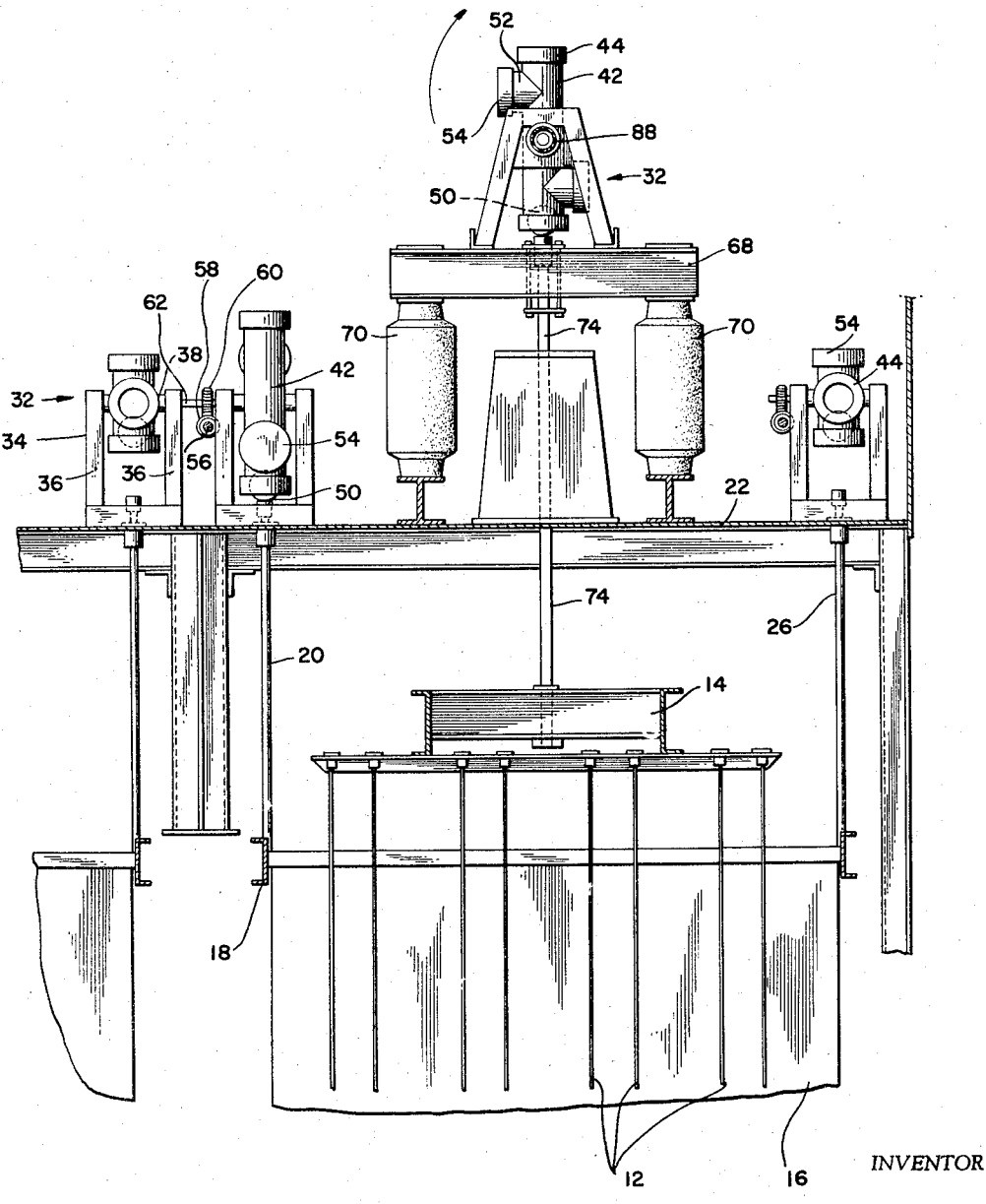

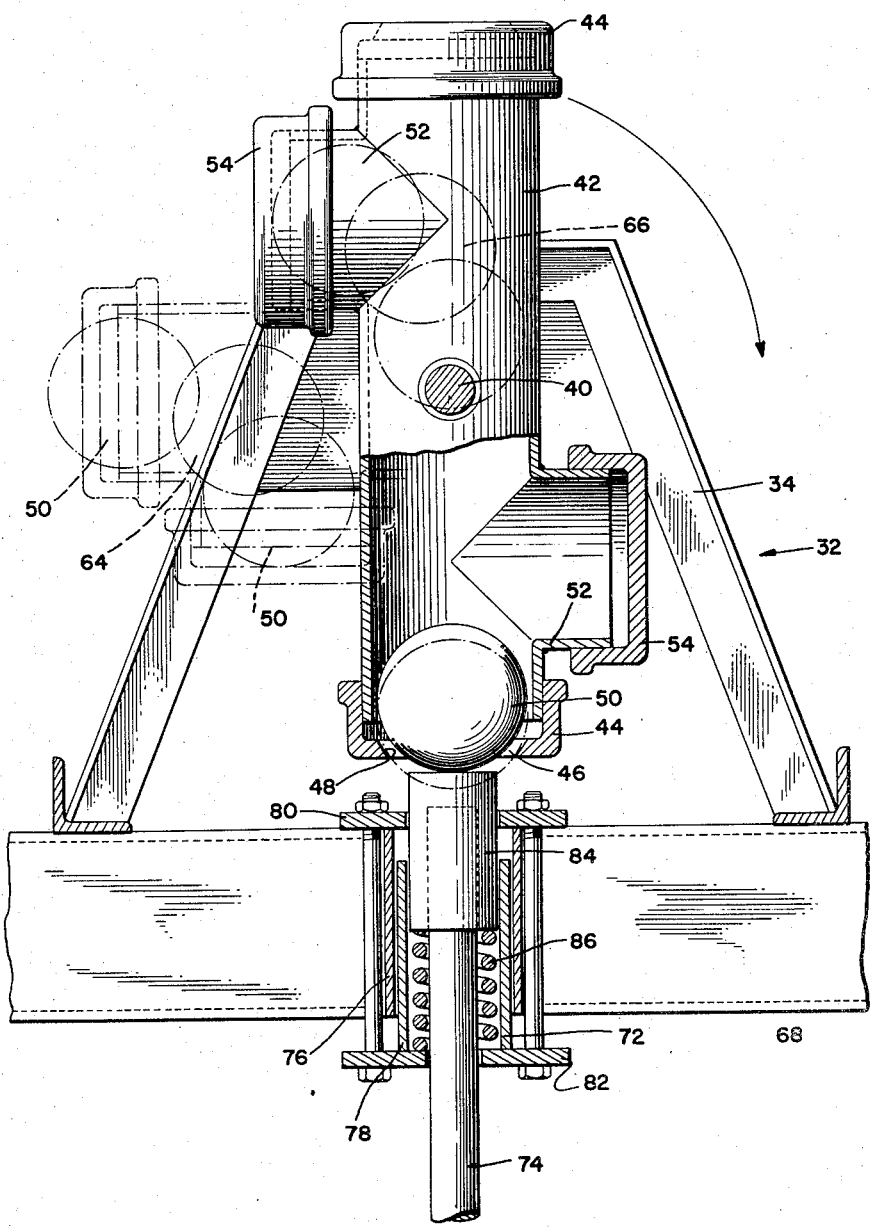

2,893,511

RAPPING DEVICE

Richard T. Egan, Basking Ridge, N.J., assignor to Research-Cottrell, Inc., Bridgewater, N.J., a corporation of New Jersey Application April 12, 1957, Serial No. 652,560

6 Claims. (Cl. 183—7)

The present invention relates generally to the dust collector art and in particular to rapping mechanism for the electrode assemblies of electrical precipitator apparatus.

Electrical precipitator apparatus often require a substantially continuously functioning and highly effective system for maintaining both collecting and discharge components therein free of collected material deposits. At the same time such systems must necessarily be constituted by positive acting, easily controllable components of minimum size and space requirements and of durable yet relatively inexpensive construction.

It is, therefore, a general object of this invention to provide an electrode rapping device for use with both collecting and discharge electrode assemblies in electrical precipitators, which will satisfy all the basic requirements as to size, continuous function and simplicity and economy of construction and installation.

Another object of this invention is to provide a new and useful system of rapping mechanisms which will generally function to maintain the collecting or discharge electrodes of precipitator apparatus in clean, efficient condition.

Still another object of the present invention resides in the provision of a highly unique and useful rapping device, as a component of the system, which is operable by simple control mechanism to deliver positive, effective rapping blows to the electrode or electrode system associated therewith.

A still further object and advantage of the present invention is the provision of a novel electrode rapping system composed of rapping components and operating means therefor which require a minimum of space and which function continuously at selectable frequencies to deliver positive rapping blows to the associated electrode or electrode system.

Another and important object and specific advantage of this invention is the provision of a new and useful rapping system and rapping device for the electrodes of electrical precipitators and the like which is economical in manufacture, installation and use and which is composed primarily of rapping components which may be quickly and easily installed and/or removed from the system with a minimum requirement of time and labor and in which the component elements are durable and long-lasting in use.

Still additional objects and advantages of this invention will become evident to those skilled in this general art when the following description is considered in the light of the accompanying drawings wherein there is disclosed operable embodiments of the present invention for the purposes of clearer illustration and ready understanding.

The present invention generally contemplates the provision of rapping mechanism for the collecting and discharge components of dust collecting apparatus which includes an elongated tube rotatably mounted on an axis perpendicular to its longitudinal axis, a captive weight within the tube and movable longitudinally therein, and members on said tube permitting the partial extension of said weight beyond the end of said tube, and means for rotating said tube about its pivotal axis to bring the remote ends thereof alternately into closely spaced adjacency to an anvil member having connection with the components to be rapped; whereby the capitve weight will move from one end of said tube to the other contacting said anvil member through the ends of said tube as each end is brought into close proximitey to said anvil member.

Referring now to the accompanying drawings wherein like reference characters designate similar parts throughout the several views and in which is shown one illustrative embodiment of the invention:

Fig. 1 is a front elevation of a fragmentary portion of a precipitator with the novel rapping components operably associated therewith.

Fig. 2 is a vertical end section taken on line 2—2, Fig. 1.

Fig. 3 is an enlarged side elevation in partial vertical section of one of the typical rapping devices for the high tension discharge electrode system.

With reference to the accompanying drawings there is disclosed in Fig. 1 a general arrangement of the parts and constructions constituting an illustrative embodiment of the present invention wherein 10 generally designates the electrode assemblies of a typical electrical precipitator including discharge electrodes 12 suspended in spaced relationship from a high tension frame 14 supported horizontally in the upper end of the precipitator. A plurality of parallel spaced collecting plate electrodes 16 are supported from hanger frames 18 to dispose the electrodes in usual manner one equidistant between each pair of spaced rows of discharge electrodes. The collecting electrode hanger frames 18 are supported horizontally in the upper end of the precipitator by hanger rods or straps 20 which are suspended from the uppermost frame member 22 in the precipitator housing by cushioned or resilient attachment, as at 24, thereto.

Each of the collecting electrode hanger frames 18 is provided with a vertically extending rapper rod 26 rigidly affixed thereto and projecting vertically through a guide bushing 28 in the upper frame 22 thereabove to present immediately above the bushing an anvil block or head 30. Associated with each rapper rod 26 and its anvil head 30 is a rapping device 32 for delivering positive rapping blows to the upper surface of the anvil head to be transmitted through the rapper rods to the electrode hanging frame 18 to dislodge collected materials from the electrodes for discharge by gravity through appropriate and conventional structure at the lower end of the precipitator.

In the illustrative embodiment disclosed, each of the rapping devices 32 consists of a supporting frame 34 taking the form of a pair of spaced, inverted U-shaped standards 36 having aligned bearing blocks 38 secured to their upper ends in opposition to one another for the reception and rotatable support of pintles 40 projecting in diametrically opposed relationship from the outer wall of an elongated tubular housing 42 at points equidistant between the remote ends of the tubular housing. Each end of the tubular housing, as is best seen in Fig. 3 of the drawings, is provided with a cap 44 having a central opening 46 therein and having a tapering or inclined annular wall 48 through the depth of the end of the cap whereby the diameter of the opening on the inner face of the cap is substantially equal to the inner diameter of the tube while the diameter of the opening in the outer face of the cap is less than the diameter of the inner end of the opening and the diameter of the tube. Located within the tubular housing 42 is a round ball weight 50 of slightly lesser diameter than the inner diameter of the tube and of slightly greater diameter than the diameter of the opening 46 on the outer face of the cap 44. The tubular housing 42 is provided at two points thereon with perpendicularly flanged tubular extensions 52 of the same diameter as the internal diameter of the tube and each of which is provided with an end enclosing cap 54. The two extensions are located one closely adjacent each of the remote ends of the tubular housing and in diametrically opposed relationship to each other relative to the axis of said tubular housing.

Associated with each of the rotatably mounted tubular housings 42, as best seen in Figs. 1 and 2, is a drive shaft 56 which carries adjacent to each of said housings a gear 58 in operable mesh with a gear 60 secured on an extended end 62 of one of the two pins 40 secured to the housing and projecting through the tubular bearing support 38 on that side thereof. The drive shaft 56 is driven by any suitable power means located within or externally of the precipitator apparatus which produces rotation of the shaft gear 58 and hence of the tubular housing gear 60 whereby said housing is rotated about its pivotal support to bring the ends thereof alternately into close adjacency with the anvil head 30 on the associated rapper rod. As is best seen in Fig. 1 a single drive shaft 56 may be utilized for producing rotation of the tubular housing members of a plurality of rapping devices arranged transversely of the precipitator shell each in association with a selected group or bank of electrodes transversely of the shell. Additionally, as best seen in Fig. 2, a single drive shaft 56 may be operably connected to the extended pin supports of adjacently located rapping devices longitudinally of the shell by the utilization of a single gear 60 carried on abutting ends of extended tubular housing pins.

In operation of the collecting electrode rapping system and components hereinbefore described, drive shaft 56 will produce continuous rotation of each of the tubular housings operably driven therefrom whereby the ball weight 50 in each tubular housing will be alternately shifted by gravity from one end of the housing to the other as the housing ends are alternately brought into a lowermost position adjacent their associated rapper rod anvil head. As is best seen in Fig. 3, the ball weight 50 in each tubular housing when it falls to the lowermost positioned end of the housing will project for a spaced distance through the cap opening 46 and this projected or extended portion of the ball weight will positively and forcefully engage the adjacently positioned anvil head of the associated rapper rod to produce a positive rapping force through said rod on the hanger frame to induce vibration of the collecting electrodes suspended from the frame.

Still referring to Fig. 3 it will be seen that rotation of the tubular housing 42 in the direction indicated by the arrow will cause the ball weight 50, as shown in dotted line at 64, to move from its projected position in the end of the housing back into the tube and downwardly into the adjacent tubular projection 52 when the tubular housing has moved through 90 degrees wherein it will remain until the adjacent end of the housing has reached its substantially uppermost position in its arc of rotation, whereupon the ball weight 50 will move by gravity, as is indicated at 66, inwardly of the tube where it is free to fall to the full line and strike an associated anvil member positioned immediately below the second and now lowermost end of the tubular housing.

A separate and distinct rapping system is provided within the precipitator apparatus for the discharge electrodes of the apparatus. In this latter system a plurality of rapping devices identical to those hereinbefore described are supported by their supporting frames 32 on elevated frame components 68 which in turn are supported by insulators 70 above the upper precipitator frame 22. Each of the elevated frames 68 is provided with a support bracket 72 immediately below the tubular housing of the rapping device thereabove and said support bracket receives the upper end of a rapper rod 74, the lower end of which is secured to the high tension frame 14 from which the discharge electrodes of the precipitator are suspended. The support brackets 72 consist of two concentrically positioned tubes 76 and 78 rigidly secured each to one of two remotely located end plates 80 and 82 respectively with the uppermost end plate 80 being supported on the elevated frame 68. The upper end of rapper rod 74 extends concentrically and slidably through the innermost tube 72 and carries an enlarged anvil head 84 thereon the lower end of which seats against the upper end of a coil spring 86 within the tube the lower end of which spring is seated on the inner face of the end plate 82. The upper end of the anvil head 84 projects telescopically outward above the upper plate 80 in closely spaced relationship to the lowermost point in the arc defined by the remote ends of the rotating tubular housing 42.

Associated with the supporting pins 40 of each of the high tension rapping devices is a drive shaft 88 operably powered and insulated from a remote source to produce rotation of the tubular housing in the same manner as hereinbefore described whereby the ball weight 50 in each housing will be alternately released to fall against the upper end of the anvil head member 84 operably positioned relative to the rapping device and carried by the rapping rod 74 connected to the high tension supporting frame for the discharge electrodes. As best seen in Fig. 1 of the drawings, it is possible to provide interrupted sections of the drive shaft 88 in extension transversely of the precipitator intermediate spaced rapping devices.

From the foregoing it is seen that a new and useful system or arrangement for rapping components have been provided for the collecting and discharge electrodes of precipitators to maintain the electrodes substantially free of collected deposits. It is also seen that separate systems or combinations of rapping mechanism have been provided for the collecting and the discharge components of the apparatus wherein the proper electrical characteristics of each are maintained independent of one another but wherein a minimum of expensive parts and construction are utilized to accomplish the desired result. It is, of course, fully contemplated that any one of a number of driving arrangements could be utilized so that all of the rapping devices of the collecting or the discharge system, or both, could be driven from a common power source and that the frequency of rapping vibration may be readily controlled through the speed of rotation of the several rapping components in each of the two systems. Very satisfactory results have been obtained with a 5-inch ball dropping about 15 inches and rotated at about ⅕ r.p.m. to provide a rapping impact of about 20 ft. lbs. It will be appreciated that the speed of rotation may be varied substantially as long as the centrifugal force on the ball caused by the rotation of the tube is not greater than the weight of the ball.

It is also evident that the illustrative embodiment of the present invention hereinbefore disclosed provides a simple and rugged construction operable at relatively slow operating speeds to produce efficient cleaning of the electrode system of the collecting apparatus. It is fully contemplated that numerous variations and modifications could be made in the components hereinbefore described without departing from the basic concepts and scope of the present invention.

Accordingly, having fully described and explained the present invention, its construction and operation, and having made evident the attainment and accomplishment of the advantages and objects hereinbefore set forth, what is desired to be claimed is:

1. A rapping device including an elongated tubular member having restricted end openings, a captive weight freely movable within said tubular member from a partially extended position through one end opening to a like position at the remote end, said tubular member being rotatably supported intermediate its length, means for rotating said tubular member about its support an anvil member positioned vertically below said tubular member and adapted to be struck by the portion of said weight extending through the end openings as the tubular member is rotated.

2. A construction as defined in claim 1 wherein said tubular member is provided with a weight receiving chamber adjacent each end thereof, each of said weight receiving chambers opening into said tubular member from diametrically opposed positions thereon offset longitudinally of said tubular member to project in directions opposite to the direction of rotation of the tubular member.

3. In combination with an anvil member in dust collecting apparatus, a rapping device including an elongated tubular member having restricted openings in the opposed ends thereof, a captive weight in said tubular member movable from a position of partial projection through one end opening of the tubular member to a like position at the opposed end, said tubular member being rotatably supported intermediate its length, means for continuously rotating said tubular member, and the relative positioning of said tubular member and said anvil being such that the plane of the anvil face is substantially tangential to the arc defined by the remote ends of the tubular member.

4. In an electrical precipitator an electrode rapping device including an elongated tubular member having restricted end openings, a captive weight freely movable within said tubular member from a partially extended position through one restricted end opening thereof to a like position at the remote end, said tubular member being rotatably supported about a horizontal axis intermediate its length, power means for rotating said tubular member about its axis an anvil member positioned vertically below said tubular member and adapted to be struck by the portion of said weight extending through the end openings as the tubular member is rotated, said anvil member being in vibration transmitting association with electrodes to be rapped.

5. The invention defined in claim 4 wherein said tubular member is provided with a cap member on each end thereof, each of said cap members having centrally thereof a tapered wall opening of greater internal area than external area, and said weight having its greatest cross sectional area intermediate the areas at the inner and outer ends of said cap openings; whereby a portion of said weight is extensible through said cap openings.

6. In an electrical precipitator an electrode rapping device including an elongated tubular housing having restricted end openings, a captive weight freely movable longitudinally within said tubular housing from a position of partial extension through one restricted end opening thereof to a like position in the second end opening, a weight receiving chamber formed on said housing adjacent each end thereof, each of said weight receiving chambers opening perpendicularly into said tubular housing from diametrically opposed positions thereon offset longitudinally of said housing, said housing being rotatably supported about a horizontal axis, and power means having operable connection with said housing to rotate the same in a direction whereby said perpendicularly opening chambers will be maintained in trailing positions relative to said housing.

References Cited in the file of this patent
UNITED STATES PATENTS 2,518,995   Owen _____ Aug. 15, 1950

FOREIGN PATENTS 421,566   Germany _____ Nov. 11, 1925